March 16, 1965  D. D. REDHED  3,173,213
DISPLACEMENT MEASURING APPARATUS
Filed March 1, 1962  2 Sheets-Sheet 1
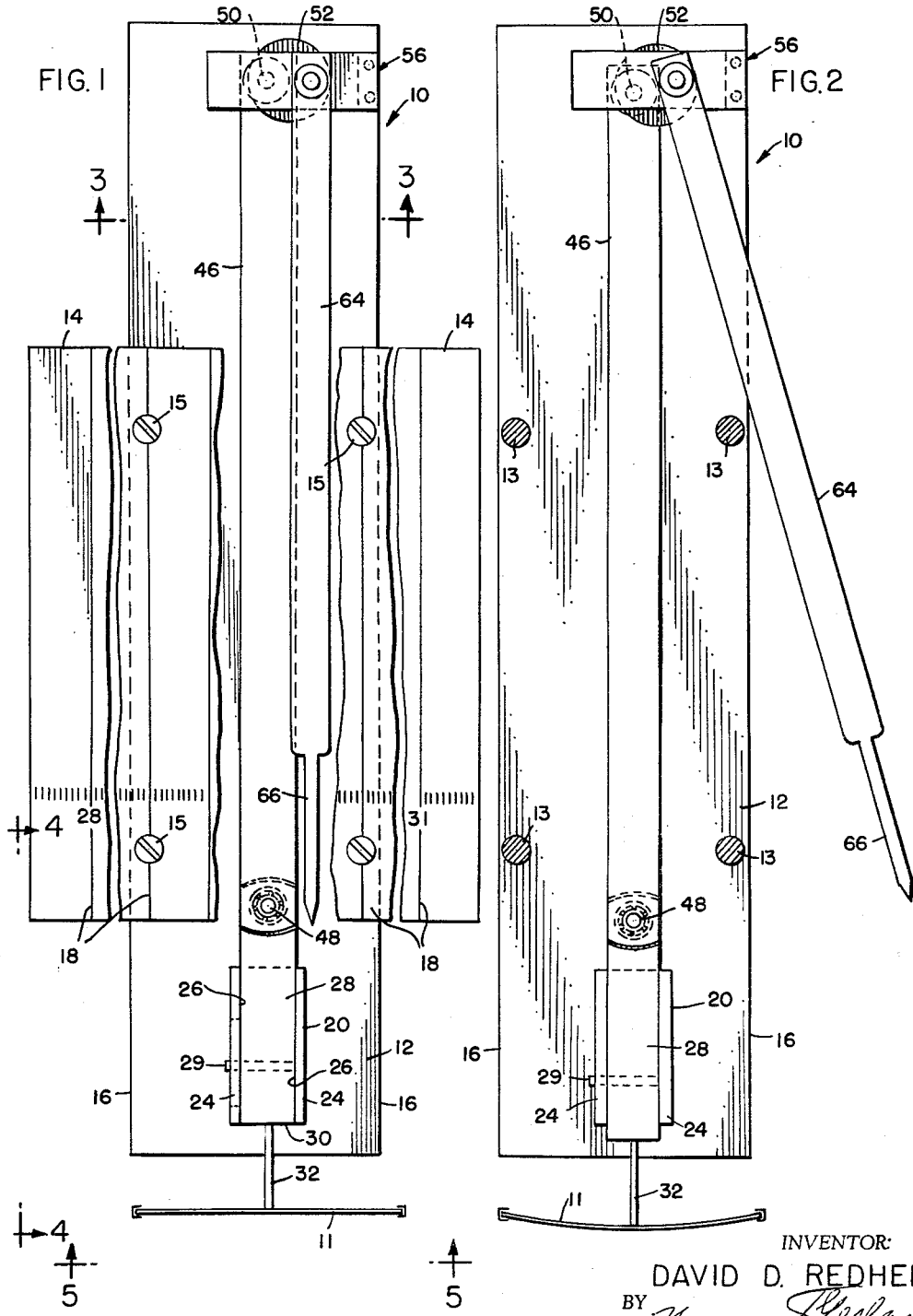
INVENTOR:
DAVID D. REDHED
BY
ATT'Y March 16, 1965 D. D. REDHED 3,173,213
DISPLACEMENT MEASURING APPARATUS
Filed March 1, 1962 2 Sheets-Sheet 2
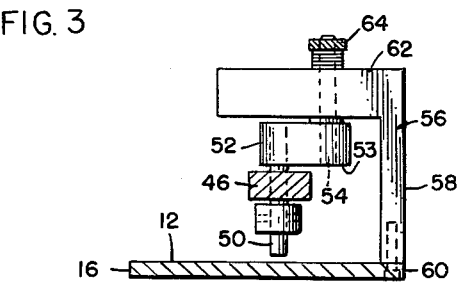
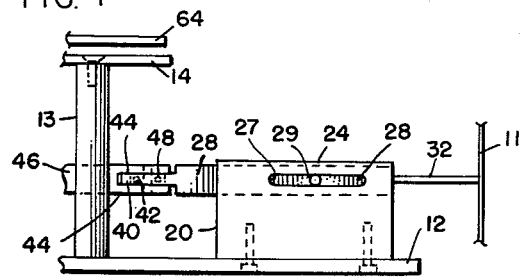
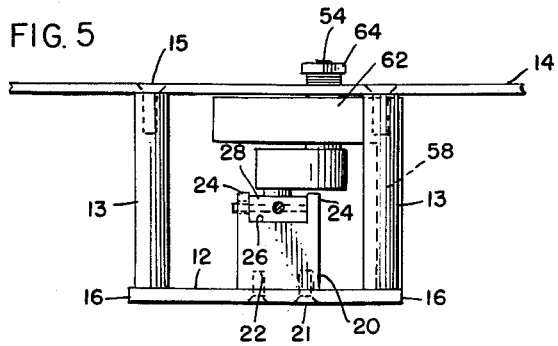
INVENTOR:
DAVID D. REDHED
BY Norman Herlach
ATT'Y › # United States Patent Office 3,173,213
Patented Mar. 16, 1965

3,173,213
DISPLACEMENT MEASURING APPARATUS
David D. Redhed, 11059 Rowan Road S., Seattle, Wash.
Filed Mar. 1, 1962, Ser. No. 176,727
2 Claims. (Cl. 33—172)

The improved displacement measuring apparatus comprising the present invention is capable of a wide variety of applications and, in general, it will find use wherever it is desired to indicate or record the displacement of a movable member. The apparatus is concerned primarily with relatively small displacements which cannot effectively be measured directly, either for indication or recording thereof and, therefore, require large magnification for either purpose. It also is primarily concerned with measurement of linear displacements, i.e., straight-line displacements which take place in one direction or dimension only, or with the measurement of a linear component of displacement of a member which moves in non-linear fashion.

An apparatus constructed according to the principles of the present invention may be found useful in connection with the amplification and measurement of the linear output displacements of diaphragms and bellows such as may be associated with pressure or suction measuring instruments, for example, the diaphragm of an aneroid barometer or the bellows of a steam pressure gauge. It also may be found useful in connection with the amplification and measurement of the linear component of displacement of a Bourdon tube for the measurement of internal pressures; of the displacement of a thermally responsive bimetallic strip forming a part of a thermostat; of the lateral displacement of a beam under load in the measurement of load stresses; and of the displacement of the output members which are associated with a wide variety of instruments. Irrespective, however, of the particular use to which the present invention may be put, the essential features thereof are at all times preserved.

Heretofore, in displacement measuring apparatus of the linkage mechanism type wherein amplification takes place, the linear displacement undergoing measurement is converted or translated into angular displacement of one or more elements of the linkage so that the displacement of the final indicating or recording element of the linkage is a non-linear displacement. Where the indicating or recording function is effected by the final movement of an element which has an angular displacement, the use of a scale which is of arcuate design and of which the graduations thereof are spaced so that they compensate for the non-linearity of displacement constitutes one means which has been resorted to in an effort to obtain accurate readings or recordings. Where it has been required that the final indication or record be a linear one, various means have been devised within the linkage mechanism itself whereby any non-linearity, arising by reason of one element of the linkage, is compensated for by the provision of a counterpart element of the linkage mechanism, the function of which is to nullify or correct the non-linearity and thus restore the system to a linear one for the final indication or record. Such linkage mechanisms are complicated and the numerous pivot points, both fixed and movable, as well as the pin and slot or other sliding connections between adjacent links of the system, lead to cumulative lost motion errors which become magnified in proportion to the amplification of the displacement involved. Throughout such linkage mechanism, circular aberration takes place as the various shifting pivot points approach their final positions and such aberration is transmitted in magnified form to subsequent portions of the linkage mechanisms so that the final readings or recordings are not accurate over the entire scale.

The present invention is directed to an extremely simple displacement measuring apparatus having a linkage mechanism whereby the linear displacement of an object, such as the diaphragm of an aneroid barometer, a pressure gauge or the like, may be greatly amplified and the amplified displacement indicated or recorded on a linear scale, the linkage system involving only two relatively movable linkage elements, the two elements being pivotally connected together, and one of them being pivotally connected to the movable member, the displacement of which is to be measured.

The provision in a measuring apparatus of a linkage mechanism of the character briefly outlined above being among the principal objects of the invention, it is a further object to provide such a linkage mechanism wherein a high degree of accuracy over the entire indicating or recording scale is attained with a minimum of aberration at either end of the scale.

Still another object of the invention is to provide in a measuring apparatus of the character under consideration a novel linkage system wherein the non-linear movement of the final indicating or recording element of the system, although movable in a non-linear path, cooperates with the associated indicating or recording scale to produce a linear reading or recording of displacement.

The provision of a displacement measuring apparatus which is extremely simple in its construction and, therefore, may be manufactured at a low cost; one which is comprised of a minimum number of parts, particularly moving parts and, therefore, is unlikely to get out of order; one which is capable of a high degree of amplification with a minimum of error; and one which, otherwise, is well adapted to perform the services required of it, are further desirable features which have been borne in mind in the production and development of the present invention.

In the accompanying two sheets of drawings forming a part of this specification, one illustrative embodiment of the invention as embodied in a typical environment has been shown.

In these drawings:

FIG. 1 is a plan view of a displacement measuring apparatus constructed in accordance with the principles of the present invention and showing the apparatus operatively applied to the measuring of the displacements of a flexible diaphragm, a portion of the recording chart being broken away;

FIG. 2 is a fragmentary plan view similar to FIG. 1 but showing the parts in a different position;

FIG. 3 is a sectional view taken on the line 3—3 of FIG. 1;

FIG. 4 is a sectional view taken on the line 4—4 of FIG. 1; and

FIG. 5 is an end view of the apparatus.

Referring now to the drawings in detail and in particular to FIGS. 1 and 2, an apparatus constructed according to the present invention has been designated in its entirety by the reference numeral 10 and is shown as being operatively applied to a flexible diaphragm, fragmentarily shown at 11, for measuring the linear displacements of the central region of the diaphragm. For purposes of discussion herein the diaphragm 11 may be regarded as being the movable element of an aneroid barometer which is responsive to fluctuations in atmospheric pressure, such an instrument consisting essentially of a closed metal box, one side of which is the diaphragm 11. The air within the box is partially exhausted to place the diaphragm in a state of equilibrium so that it may flex in opposite directions as the pressure of ambient air increases or decreases. Instead of the conventional system of linkages ordinarily employed for amplifying the linear displacements of the diaphragm 11 and resulting in a non-linear representation of such displacements, the novel linkage mechanism of the present invention which results in a linear representation of these displacements has been substituted. It is to be distinctly understood that the environmental disclosure selected herein for illustrative purposes is purely exemplary and that the novel linkage mechanism and the linear representation effected thereby may be employed for amplifying and indicating or recording the displacement of movable output diaphragms, bellows and the like associated with a wide variety of instruments and devices, such as pressure gauges, temperature indicating devices and the like. In fact, the displacement measuring apparatus of the present invention is not limited to measurement of the displacement of movable diaphragms, bellows and similar pressure responsive devices, it being applicable to the measurement of small increments of linear motion of a wide variety of objects capable of limited linear displacements.

The apparatus 10 involves in its general organization a flat base plate 12 of elongated narrow rectangular design and from which there projects upwardly a series of supporting posts 13, the upper ends of which serve to support thereon a flat indicating or scale plate 14, suitable anchoring screws 15 being employed for securing the plate in position on the posts. The scale plate 14 is thus supported in spaced relation with respect to the base plate 12 and the end regions of the scale plate 14 overhang the longitudinal side edges 16 of the base plate 12 by an appreciable margin.

The scale plate 14 has inscribed thereon a linear scale in the form of a series of longitudinally extending elongated graduation marks or indicia 18, the various indicia being in the form of straight lines which are of appreciable longitudinal extent with adjacent indicia being equally spaced from each other. While any desired number of such indicia may be employed, and any desired spacing thereof employed to accommodate the particular use to which the apparatus may be put in the illustrated form of the invention, conventional barometric indicia ranging from 28 to 31, inclusive, and divided into tenths has been shown in connection with the scale plate 14, the mid-graduation being 29.5. The major graduations, of course, represent the number of inches of mercury which the atmosphere will support at 0° centigrade.

As will be pointed out in greater detail presently, the various elements of the leverage system employed in connection with the present displacement measuring apparatus underlie the scale plate 14 while the movable output element of the leverage system overlies the scale plate and, in combination therewith, effects the desired linear indication.

Still referring to FIGS. 1 and 2 and, additionally, to FIGS. 4 and 5, the base plate 14 has secured thereto in the front regions thereof a guide block 20, suitable securing screws 21 being employed for maintaining the block in position on the base plate. The guide block 20 includes a relative massive body part 22 from which there projects upwardly a pair of spaced side walls 24 which provide between them a guideway 26 within which there is slidable a primary displacement member 28 in the form of an elongated rectangular block. The primary displacement member is generally rectangular in transverse cross section and it fits snugly within the guideway 26 so that there can be no lateral displacement or play of this member, nor can there be any deviation of the member from the longitudinal axis of the guideway.

One of the side walls 24 of the guide block 20 is formed with an elongated longitudinally extending slot 27 therein and the primary displacement member 28 is provided with a laterally extending pin 29 which projects into the slot 27 and rides therein during the longitudinal movements of the primary displacement member in either direction.

The pin and slot connection just described serves to retain the primary displacement member 28 within the guideway provided for it in the guide block 20.

Means are provided for causing the primary displacement member 28 to follow the displacement of the medial region of the diaphragm 11 and, accordingly, the forward end face 30 of the member 28 is operatively connected to the diaphragm by a rigid thrust link or rod 32 which extends normal to the end face 30, as well as to the general or normal plane of the diaphragm. It is obvious that, upon lateral displacement of the diaphragm 11 in either direction, due to a rise or fall in atmospheric pressure, the thrust link or rod 32 will shift endwise accordingly and thus impart its longitudinal motion to the primary displacement 28. The movements of the diaphragm 11 and, consequently, the straight line linear movements of the primary displacement member 28, are relatively small, as well as being gradual, and the displacements represented thereby are entirely too small for direct visual indication or recording purposes. It is, therefore, the principal object of the present apparatus to effectively amplify these small movements with a minimum of error and to present them, either for visual indication by means of a scale and pointer, or for recording by means of a graph or chart, the representation in either event being a linear one commensurate with the extent of the displacement of the primary displacement member 28.

Accordingly, the rear end of the primary displacement member 28 is formed with an attachment ear 40 which extends into the slot 42 which exists between the furcations 44 provided at the forward bifurcated end of an elongated link 46. A pivotal connection 48 is established between the thus interlocked parts, the connection being a precision one as, for example, a carefully fitted ball or roller bearing, or a jewelled bearing, so that there will be no looseness between the pivoted parts with a consequent loss of accuracy in the final indication or recording.

The rear end of the link 46 is pivotally connected to an eccentric pivot pin 50 carried by a pointer-support 52 which preferably is in the form of a solid cylindrical member, the axis of which extends vertically and from the lower end face 53 of which the eccentric pin 50 projects downwardly as best seen in FIG. 3. The pointer-support 52 is itself connected by a pivot pin 54 to an inverted L-shaped supporting bracket 56 having a vertical leg 58 secured by attachment screws 60 to the upper face of the base plate 12, and a horizontal leg 62 which overlies the base plate and is spaced upwardly therefrom. The cylindrical pointer-support 52 underlies the horizontal leg 62 in close proximity thereto. The pivotal connections afforded by the pivot pins 50 and 54 may have precision bearings associated therewith so that there will be no lost motion between the parts.

The pivot pin 54 projects above the horizontal leg 62 of the supporting bracket 56 and has fixedly secured thereto for movement in unison therewith an elongated pointer arm 64, the distal end of which provides a pointer proper 66. The pointer arm 64 closely overlies the scale plate 14 and the pointer proper 66 is designed for cooperation with the scale graduations 18 in a manner that will be made clear presently.

It is to be noted that in the illustrated form of the apparatus 10, the length of the link 46 is approximately equal to the effective length of the pointer arm 64, while the amount of eccentricity of the pivot pin 50, i.e., its distance from the pivot pin 54, is appreciably less than the length of either the link or the arm. The ratio of the length of the pointer arm 64 to the eccentricity of the pivot pin 50 determines approximately the multiplication or amplification of the displacement of the primary displacement member 28. The ratio between the length of the link 46 and the eccentricity of the pivot pin 50 is a measure of the accuracy of the amplification involved and, therefore, it is desirable that this ratio be as large as possible although, of course, within the limits of feasability considering the overall size of the apparatus. Under favorable circumstances, with precision workmanship and extremely accurate bearings, a ratio as high as 200 to 1 is attainable with a corresponding degree of amplification and a high degree of accuracy.

The purpose of making the link 46 as long as possible is to reduce to a minimum the extent of its swinging movement about the pivotal connection 48 so that its movements have as large a component of axial directional movement as possible to the end that substantially all of the longitudinal displacement of the primary displacement member 28 will be applied to movement of the pointer arm 64 with little error arising from lateral displacement of the rear end of the link 46. It is to be noted that when a high ratio is maintained between the length of the link 46 and the eccentricity of the pin 50, each increment of longitudinal displacement of the primary displacement member 28 results in a small component of lateral displacement of the pivot pin 50. When the primary displacement member 28 is fully retracted, i.e., when it is in its extreme forward position so that the pivot points 48, 50 and 54 are as nearly in alignment as is possible, an initial increment of rearward movement of the primary displacement member will effect a relatively large increment of lateral displacement of the pivot pin 50, accompanied by a relatively small increment of longitudinal displacement of this pin. As the rearward movement of the primary displacement member continues, the increments of lateral displacement of the pin 50 become less while the increments of longitudinal displacement become greater until such time as the mid-position of the primary displacement member is reached. Thereafter, as the primary displacement member continues to move rearwardly, the increments of lateral displacement of the pin again begin to increase while the increments of longitudinal movement thereof begin to decrease. The net result of these phenomena is that increments of longitudinal motion of the primary displacement member which take place near the end of its path of travel will cause relatively large increments of angular displacement of the pointer arm 64 with correspondingly large increments of circumferential displacement of the pointer proper 66. On the other hand, increments of longitudinal motion of the primary displacement member which take place near the mid-position of the path of travel thereof will cause relatively small increments of angular displacement of the pointer arm 64 with correspondingly small increments of circumferential displacement of the pointer proper 66. If the primary displacement member 28 were to move back and forth in its linear path at a constant rate of speed, the pointer proper 66 would sweep back and forth in its arcuate path of movement, accelerating as it approached the ends of each sweep and decelerating as it approached its mid-position or, in other words, in what may be regarded as the reverse of a simple harmonic motion. Considering now the path of movement of the pointer proper 66 with relation to the equally spaced scale graduations 24, it will be observed that in moving from one gradutaion to the next near the end of the pointer arm stroke, the pointer proper must move through a relatively long arc. In moving from one graduation to the next near the medial portion of the pointer arm stroke, the pointer proper will move through a relatively short arc. Since the pointer proper 66 travels at a greater rate of speed near the end of its stroke as previously described, and since it is required to traverse a greater distance to bridge a pair of adjacent graduations, it will travel the necessary distance in what may be regarded for purposes of discussion herein as a unit length of time. Near the mid-point of its travel, the pointer proper travels at a slower rate of speed and, since it has a shorter distance to travel in bridging the distance between adjacent graduations, it also will travel the necessary distance in a unit length of time. It is in this manner that the non-linearly moving pointer proper 66, when traversing the linear scale afforded by the graduations 24 will accurately reproduce in linear fashion and with a large degree of magnification or amplification the relatively small linear displacements of the primary displacement member 28.

From the above description, it will be seen that the linkage system associated with the displacement measuring apparatus 10 of the present invention is comprised of but two linkage elements, namely, the link 46 and the combined pointer arm 64 and support 52 therefor. True linear displacements of the primary displacement member 28 are converted into non-linearly or angular displacements of the pointer arm 64. However, the arcuately moving pointer proper 66, in combination with the equally graduated scale provided on the scale plate 14, converts the amplified and non-linear displacements of the pointer arm 64 back to true linear displacements over the various scale graduations 18.

The invention is not to be limited to the exact arrangement of parts shown in the accompanying drawings or described in this specification as various changes in the details of construction may be resorted to without departing from the spirit of the invention. For example, in the interests of space conservation, the pointer arm 64 in its mid-position substantially overlies or doubles back, so to speak, over the elongated link 46 so that these two elements of the linkage system assume positions of close proximity to each other. It is not necessary that the pointer arm 64 and link 46 be so arranged inasmuch as the same principles of amplification and accuracy will obtain regardless of direction of extent of the pointer arm in its mid-position. If desired, the pointer arm and link may assume positions of substantial end-to-end alignment with the scale plate being disposed at a region below the pointer arm and remote from the arm link 46. The specific shapes of the parts involved may vary appreciably from those illustrated herein. For example, the primary displacement member 28 is shown herein as being in the form of a generally rectangular block which slides longitudinally in a correspondingly shaped guideway. If desired, the displacement member 28 may be otherwise polygonal or it may be of cylindrical design, in which case, the guideway within which it is slidable will be modified in shape accordingly. The pointer arm support 52 has been illustrated herein as being in the form of a cylindrical body but it is not necessarily so. If desired, it may be of rectangular block-like design or it may be otherwise shaped. The primary displacement member 28 has been illustrated herein as being freely movable in its longitudinal linear path of movement under the motivating influence of the displacements of the diaphragm 12. However, if desired, the movements of the primary displacement member may be restrained by suitable spring or other biasing means, for example, by a spring member which yieldingly maintains the member in a mid-position and restores the same to such mid-position after it has been displaced therefrom by a motivating influence. The relative lengths of the elements of the linkage mechanism illustrated herein are exemplary and, if desired, these lengths may be varied. In general, for greater amplification, the length of the pointer arm 64 will be made greater. For greater accuracy, the length of the link 46 will be made greater. Finally, it is within the purview of the present invention to provide a suitable means for recording the amplified displacements of the primary displacement member 28 instead of merely rendering a visual indication of these displacements. In such an instance, the pointer proper 66 may be dispensed with and in its stead there may be substituted a suitable stylus which is adapted to sweep across the face of a moving chart sheet or the like to produce a desired graph, the sheet moving longitudinally through the apparatus. It is also contemplated that when the linkage system of the present invention is so disposed relatively to an object, the displacement of which is to be measured, that forces of gravity will act upon one or more of the elements of the system, suitable counterbalancing means, either spring or gravity actuated, may be employed to counteract any condition of unbalance which otherwise might obtain. In view of such contemplated modifications and alterations therefore, the invention is to be construed as broadly as the prior art will permit and within the scope of the appended claims.

Having thus described the invention what I claim as new and desire to secure by Letters Patent is:

1. In an apparatus for measuring and indicating components of linear displacement in opposite directions from an initial position of a movable element, in combination, a narrow elongated base plate, a guide member of upwardly presented channel shape configuration secured to the upper side of said base plate adjacent the forward end thereof, and having channel sides extending longitudinally of the base plate, a displacement block slidable axially in said guide member, a cooperating pin and slot connection between said displacement block and said channel sides limiting the extent of sliding movement of the displacement block within the guide member, an elongated thrust link connected at one end to the displacement block and adapted to have its other end connected to the movable element whereby the displacements of the displacement block are a function of the displacements of the movable element, a bracket mounted on said base plate adjacent the rear end thereof and including a vertical leg and a horizontal leg, the latter leg overlying the base plate, a crank arm underlying and pivoted at its proximate end to said horizontal leg for limited swinging movements in a horizontal plane about a vertical axis, an elongated link pivotally connected at one end to the distal end of said crank arm, the pivotal connection for the crank arm comprising a pivot pin fixed to the crank arm and projecting upwardly through said horizontal leg, an elongated pointer having its proximate end fixedly secured to said pivot pin above the horizontal leg and extending generally in a rearward direction so as normally to overlie the base plate, said pointer being capable of angular swinging movements in a plane parallel to and overlying the base plate and horizontal leg, a flat scale plate supported on said base plate and disposed in a plane parallel to and underlying the plane of swinging movement of the pointer, and a linearly straight scale having equally spaced graduations thereon, provided on the scale plate, extending at a right angle to and transversely of the base plate, the ratio of the length of said link to the effective length of the crank arm being no less than 100 to 1, said pointer extending parallel to the elongated thrust link when the displacement block is in its initial position as determined by the initial position of the movable element, said crank arm extending at a right angle to the pointer.

2. In an apparatus for measuring and indicating components of linear displacement in opposite directions from an initial position of a movable element, the combination set forth in claim 1 and wherein the path of movement of the distal end of the pointer intersects the scale at points which are removed from the pivot pin by a distance substantially equal to the effective length of said link.

References Cited in the file of this patent

FOREIGN PATENTS

| 264,013 | Switzerland | Dec. 16, 1949 |
| 340,636 | Switzerland | Oct. 15, 1959 |